(12) United States Patent
Gootherts

(10) Patent No.: US 8,621,480 B2
(45) Date of Patent: Dec. 31, 2013

(54) LOAD BALANCER WITH STARVATION AVOIDANCE

(75) Inventor: Paul David Gootherts, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2498 days.

(21) Appl. No.: 11/012,686

(22) Filed: Dec. 16, 2004

(65) Prior Publication Data

US 2005/0102677 A1    May 12, 2005

Related U.S. Application Data

(63) Continuation of application No. 09/768,051, filed on Jan. 24, 2001, now abandoned.

(51) Int. Cl.
   *G06F 9/46* (2006.01)
   *G06F 15/173* (2006.01)

(52) U.S. Cl.
   USPC ............ 718/105; 718/104; 709/224; 709/226

(58) Field of Classification Search
   USPC ...................................... 709/104; 718/1–105
   See application file for complete search history.

(56) References Cited

U.S. PATENT DOCUMENTS

| | | | | |
|---|---|---|---|---|
| 4,245,306 A * | 1/1981 | Besemer et al. | ............... | 709/245 |
| 5,095,427 A * | 3/1992 | Tanaka et al. | ..................... | 718/1 |
| 5,247,675 A * | 9/1993 | Farrell et al. | ................... | 718/103 |
| 5,293,620 A * | 3/1994 | Barabash et al. | ............. | 718/102 |
| 5,301,324 A * | 4/1994 | Dewey et al. | ................. | 718/105 |
| 5,379,428 A * | 1/1995 | Belo | ............................ | 718/103 |
| 5,506,987 A * | 4/1996 | Abramson et al. | ............ | 718/103 |
| 5,692,193 A * | 11/1997 | Jagannathan et al. | ........ | 718/106 |
| 5,745,778 A * | 4/1998 | Alfieri | ............................. | 712/1 |
| 5,826,081 A * | 10/1998 | Zolnowsky | .................... | 718/103 |
| 5,872,972 A * | 2/1999 | Boland et al. | ................. | 718/102 |
| 6,078,944 A * | 6/2000 | Enko et al. | .................... | 718/105 |
| 6,272,520 B1 * | 8/2001 | Sharangpani et al. | ........ | 718/108 |
| 6,289,369 B1 * | 9/2001 | Sundaresan | ................... | 718/103 |
| 6,651,082 B1 * | 11/2003 | Kawase et al. | ................ | 718/105 |
| 6,658,449 B1 * | 12/2003 | Brenner et al. | ............... | 718/105 |
| 8,099,733 B2 * | 1/2012 | Birdwell et al. | .............. | 718/105 |

OTHER PUBLICATIONS

Wolfgang Zint; Load Distribution on Microkernels; IEEE 1993; pp. 463-469.*

PHKL-20883 Patch (redacted), posted by Hewlett Packard for release to customers on Feb. 17, 2000 (23 pages).

* cited by examiner

*Primary Examiner* — Abdullah Al Kawsar

(57) ABSTRACT

A method and apparatus for balancing processing loads to avoid starvation of threads is described. A method of load balancing evaluates the load and state of multiple processors. If at least one processor is in a source state and at least one processor is in a sink state, the processing load is balanced to avoid starvation. A thread is transferred from the heaviest loaded, source state processor to the least loaded, sink state processor. Each processor load and state is then reevaluated and, if needed, the load balancing with starvation avoidance repeated.

15 Claims, 5 Drawing Sheets

LOAD BALANCER WITH STARVATION AVOIDANCE

This is a continuation of U.S. Ser. No. 09/768,051, filed Jan. 24, 2001, now abandoned.

FIELD OF INVENTION

The present invention relates to a load balancer using starvation avoidance, and more particularly, a load balancer for balancing processing loads among multiple processor queues in a multiprocessor computer system. Still more particularly, the present invention relates to a load balancer for balancing processing loads between multiple processor queues in a multiprocessor computer system while avoiding starvation of processing threads. Further, the multiprocessor computer system may encompass multiple, networked, single processor computer systems.

BACKGROUND

Operating System

The operating system (OS) or kernel is the software forming the core or heart of an OS. The kernel is loaded into main memory first on startup of a computer and remains in main memory providing essential services, such as memory management, process and task management, and disk management. The kernel manages nearly all aspects of process execution on a computer system. Processes may be typical programs such as word processors, spreadsheets, games, or web browsers. Processes are also underlying tasks executing to provide additional functionality to either the operating system or to the user of the computer. Processes may also be additional processes of the operating system for providing functionality to other parts of the operating system, e.g., networking and file sharing functionality.

The kernel is responsible for scheduling the execution of processes and managing the resources made available to and used by processes. The kernel also handles such issues as startup and initialization of the computer system.

As described above, the kernel is a very important and central part of an operating system. Additional software or code, be it a program, process, or task, is written for execution on top of or in conjunction with the kernel, that is, to make use of kernel-provided services, information, and resources.

Threads

Processes executing on a processor, i.e., processes interacting with the kernel, are also known as execution threads or simply "threads." A thread is the smallest unit of scheduling on an operating system. Normally, each process (application or program) has a single thread; however, a process may have more than one thread (sometimes thousands). Each thread can execute on its own on an operating system or kernel. There are at least two different types of threads of execution: real-time (RT) threads and time share (TS) threads.

Real-Time Threads

RT threads are threads of execution which should not be interrupted by the processor for any other thread execution. RT threads typically control or monitor mechanisms or devices which are time sensitive; usually these are much more time sensitive than TS threads. RT threads executing lock out other threads and prevent them from executing by having a high priority. A real-time thread has a real-time scheduling policy and all real-time scheduling policies feature non-degrading thread priorities. That is, a real-time thread's priority does not degrade as is consumes more processor time.

Every real-time priority is a higher priority than all time share priorities. This is necessary because RT threads are considered more important, but it does mean RT threads can starve TS threads indefinitely.

Time Share Threads

TS threads are threads other than RT threads. TS threads may be preempted by the processor to allow a RT or higher priority TS thread to execute. A TS thread has a time share scheduling policy and most, but not all, time share scheduling policies feature degrading thread priorities. As TS threads run, their priority is reduced or weakens. If the thread does not execute for a time period, its priority is increased or strengthens. This keeps aggressive threads from starving out less aggressive threads.

Load Balancing of OS

During typical load balancing of multiple processor computer systems, each processor is evaluated to determine the load present on the processor. The load on a particular processor is determined by counting the number of threads ready to run on the processor, e.g., the number of threads in a processor queue. The number of threads includes both RT and TS threads.

Example of Load Balancing

A brief example is illustrated in FIG. 1 and is illustrative of the prior art load balancing approach and its drawbacks. A computer system, described in detail below, including four processors is shown. Each processor is able to execute threads. The load balancer executes as a part of the operating software of the computer system to attempt to ensure an even distribution of threads to processors. The load balancer transfers threads between the processors to distribute the load. For example, if a processor A1 has a load of ten, meaning ten threads are awaiting execution, by processor A1, and processors A2-A4 each have loads of two, meaning two threads are awaiting execution, then processor A1 has a higher load than the other processors A2-A4. Accordingly, the load balancer transfers, or causes to be transferred, one or more pending threads from processor A1 to one or more of the other processors A2-A4. As a result of load balancing, the load on processor A1 is reduced from ten to four and the other processors load increases from two to four. All the processors A1-A4 have equal loads and the system is "load balanced."

The scenario above becomes more complicated when the threads available or executing on a given processor may be real time (RT) threads. Because RT threads may not be interrupted during execution, bottlenecks or roadblocks to other thread execution may be created by RT threads. The other threads are referred to as time share (TS) threads because they share the available processor execution time whereas RT threads do not. Therefore, it is entirely possible that a RT thread may monopolize a processor to such an extent that the TS threads fail to execute, otherwise referred to as starving or thread starvation). Using the example above, if one of the ten threads on processor A1 is a RT thread, the load on the processor A1 is still ten and the load on the other processors A2-A4 remains at two. Upon execution, the load balancer transfers the threads as described above; however, the three TS threads on processor A1 will still not execute because the RT thread is executing, in other words, the three TS threads will starve for lack of processor time. The three TS threads do not die, rather they are perpetually preempted from executing due to the RT thread.

The load balancer will not see a need to transfer any more threads between processors because the load is balanced among the processors equally. Therefore, there is a need in the art to load balance threads to avoid starvation of threads.

Many times, this situation will occur and users perceive the computer system to be "locked up" or "hung" and not executing any processes. If the computer system is accessible to the user or users, they may be inclined to cause the computer system to reboot. Depending on the RT thread and its importance, i.e., depending on the criticality of the RT thread execution, this could lead to disastrous results. In most situations, a heavily loaded multiprocessor computer system able to respond, at least minimally, to indicate that it is processing is much less likely to be restarted by a user due to the user believing the computer system to be in an error state, e.g., hung or crashed. However, many times the threads which would provide the minimal responsiveness required by the user are TS threads preempted by a RT thread. If there is a processor not starving threads, the preempted TS threads could be moved to the other processor for execution and some level of responsiveness returned to the computer system. Therefore, there is a need in the art to load balance threads to provide a responsive system having multiple processors to minimize unnecessary user intervention.

SUMMARY OF THE INVENTION

It is therefore an object of the present invention to load balance threads to avoid thread starvation.

Another object of the present invention is to load balance threads in a system having multiple processors to avoid thread starvation.

Another object of the present invention is to load balance threads to provide a responsive system having multiple processors to minimize unnecessary user intervention.

The present invention provides a method and apparatus for balancing processing loads to avoid thread starvation. A method of load balancing evaluates the load and state of multiple processors. If at least one processor is in a source state and at least one processor is in a sink state, the processing load is balanced to avoid starvation. A thread is transferred from the heaviest loaded, source state processor to the least loaded, sink state processor. Each processor load and state is then reevaluated and, if needed, the load balancing with starvation avoidance repeated.

A method aspect includes transferring a single thread at a time from the heaviest loaded, source state processor to the least loaded, sink state processor.

In another method aspect, multiple threads at a time are transferred from the heaviest loaded, source state processor to the least loaded, sink state processor.

In another method aspect, the load balancing to avoid starvation is performed periodically, such as once every second.

An apparatus aspect of the present invention for load balancing with starvation avoidance includes a processor for receiving and transmitting data and a memory coupled to the processor. The memory has stored therein sequences of instructions which, when executed by the processor, cause the processor to evaluate the load and state of multiple processors. If at least one processor is in a source state and at least one processor is in a sink state, the processing load is balanced to avoid starvation. A thread is transferred from the heaviest loaded, source state processor to the least loaded, sink state processor. Each processor load and state is then reevaluated and, if needed, the load balancing with starvation avoidance repeated.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
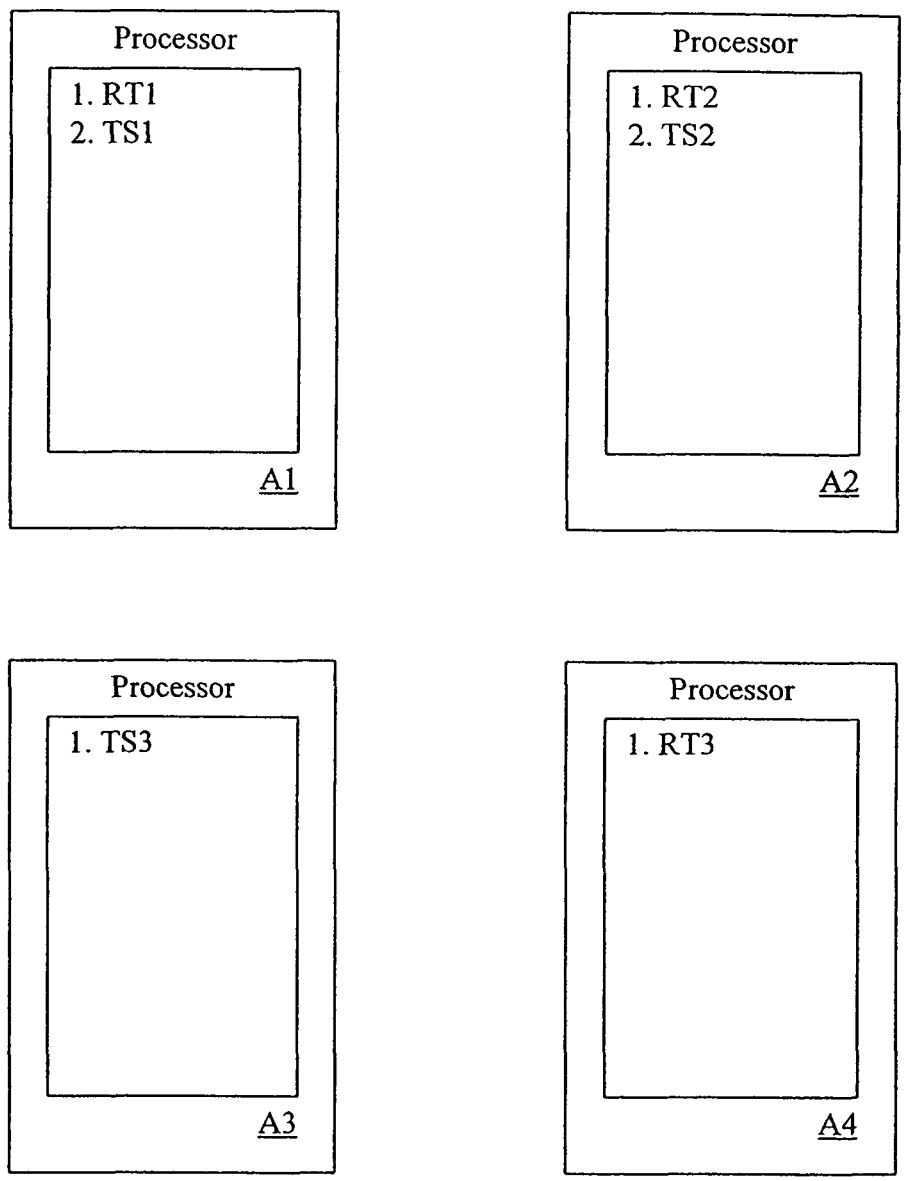
FIG. 1 is a high level block diagram of a system having multiple processors.

In computer systems having multiple processors executing real-time processing threads, a method of balancing the load on processors while preventing starvation of processing threads is described.

Multiprocessor Computer System

The present invention is operable on a computer system, as described in detail below, in particular, a computer system having multiple processors (more than one processor). Though the invention is described with reference to a multiprocessor computer system, the invention operates on single processor computer systems; however, the benefits of starvation avoidance are not realizable on a single processor computer system. Further, the invention may be practiced on computer systems comprising multiple networked computer systems.

Additionally, though the invention is described with respect to multiple, same-speed processors, it is to be understood that the invention is applicable to multiple, different speed processors, e.g., different frequency processors, as well. Using different speed processors will effect the ranking order of the processors for load balancing purposes. For instance, a similar load value, i.e., number of processes in a processor queue, on a faster processor is actually a lighter load on the faster processor in comparison to the slower processor.

Operating System (OS)

The present invention provides a novel approach to load balancing threads of execution among multiple processors in a multiprocessor computer system. Specifically, the invention allows load balancing of threads while avoiding starvation of threads.

Processor Information

As described below, each of the processors in the computer system may be designated as in either a source, sink, or neither state depending on the load on the processor and thread execution.

Within a kernel data structure, a multiprocessor information (MPI) block is stored and updated by the kernel. The MPI includes such information as a processor identifier and operating statistics about each processor, e.g., current and previous thread execution statistics. Further, the MPI includes the state of the processor, i.e., source, sink, and neither, and the starvation time, if any, of the threads waiting to execute on the processor.

The system processing unit (SPU) is the processor number identifier of the individual processor in the computer system. The SPU is also stored and updated in a kernel data structure.

The starvation limit (SL) is a predetermined amount of time within which a RT thread is executing and no TS threads have executed and thus, a processor is determined to be starving threads.

Load Balancing Portion of OS

In accordance with the present invention, each processor in the computer system may be in one of three states: source, sink, and neither. If the processor is in a source state, the processor is determined to have at least one starving thread. The starving thread would be better off, i.e., the thread would be able to execute, if it were transferred to another processor for execution.

If the processor is in a sink state, there are no starving threads on the processor. The processor in this state can accept additional threads without creating a starvation situation, i.e., no threads will starve if an additional thread is added to the processor for execution.

If the processor is in a neither state, the processor is not currently starving any threads, but if one or more threads are added, the added threads would start to starve immediately. The processor in this state does not have to offload threads nor should it receive additional threads.

Functionality Overview

During load balancing, each processor is evaluated to determine the best candidate to receive threads, i.e., the best score processor, and the best candidate for transferring threads, i.e., the worst score processor. The processor score is determined by weighting the processor state more heavily than the processor load and combining the processor state and the processor load. The processor is determined to be in one of three states, described above: source, sink, and neither.

The state of the processor is determined along with the load on the processor. The best and worst score processors are determined based on the state and then the load value. For example, the processor starving threads but with a low load value is the worst score processor in comparison with the processor without starvation but with a high load value. If there are processors that are not starving threads and there is at least one processor that is starving threads, then the starvation-based load balance is performed. In the present invention, the load value is used to differentiate between two processors having the same state. If two or more processors are starving threads, the ranking or score as between those processors is determined by the load value. Neither state processors are not scored and cannot be either a best score or worst score processor.

As processors are scored, the processor scores are compared to the existing best and worst score processors. If the current processor score is better than the best score or worse than the worst score, then the current processor is identified as the best or worst score processor, as appropriate. Therefore, only the best and worst score processors need be retained; a single evaluation of all processors will identify the best and worst processors. As a result of the processor evaluation, a best score processor and a worst score processor are identified.

During the starvation-based load balance, a single TS thread is transferred from the highest loaded, thread starving processor, i.e., a source processor, to the lowest-loaded, non-thread starving processor, i.e., a sink processor. The processor state and load is then reevaluated and the load balancing process begins again. This is performed until there are no processors starving threads or all processors are starving threads.

In alternate embodiments, more than one thread may be moved at a time or more than one thread may be moved prior to reevaluation of the processors. However, moving a single thread at a time prior to reevaluating the processors reduces the chance of overreacting to a perceived load imbalance and further degrading system performance.

Detailed Description of Process

Figure 2:
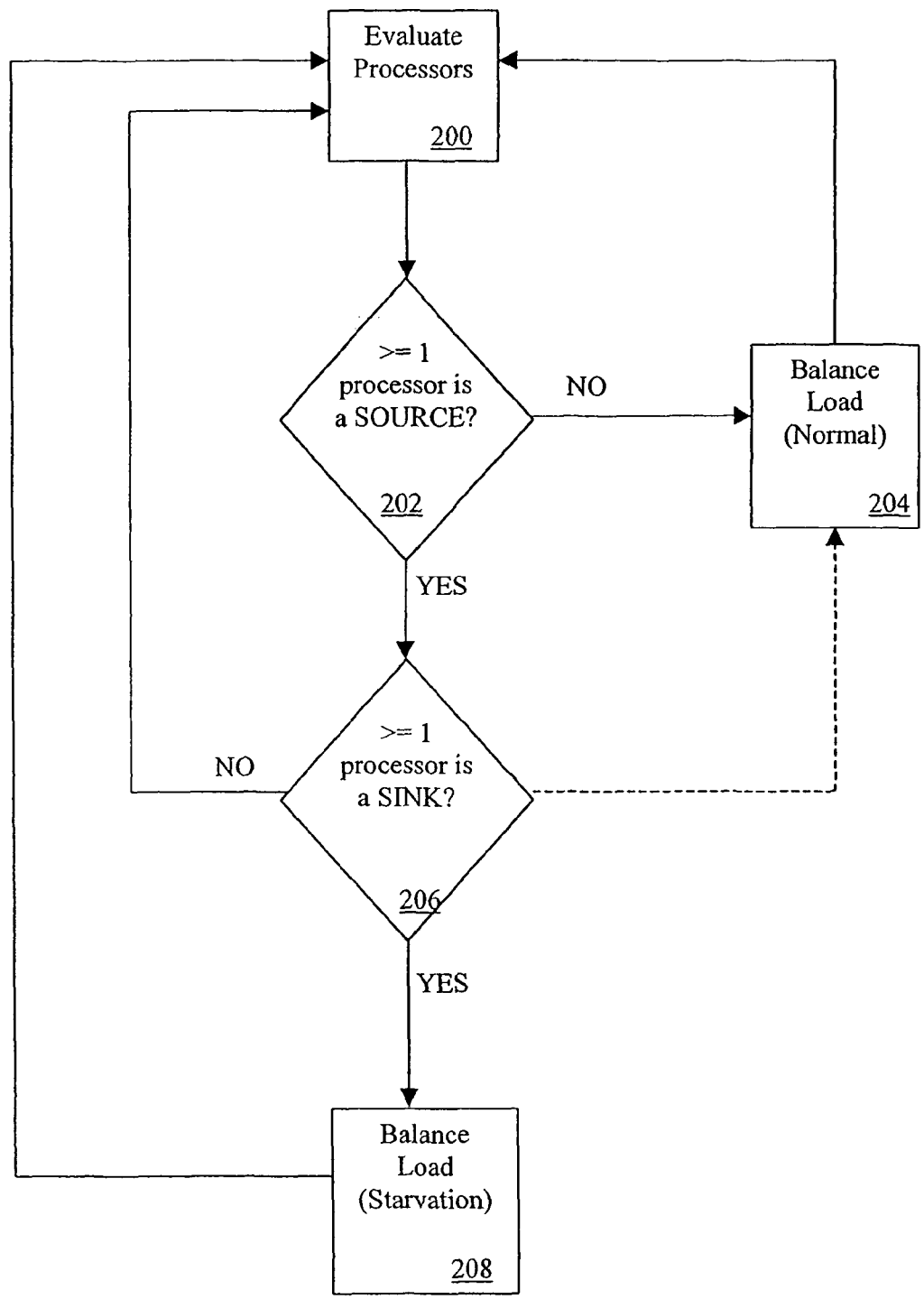
FIG. 2 is a high level flow diagram of an embodiment of the present invention.

A detailed description of the load balancing with starvation avoidance of the present invention is now provided with reference to FIG. 2. FIG. 2 is a high level diagram of the flow of execution of an embodiment of the present invention. It is to be understood that the flow depicted in FIG. 2 is only representative of the load balancing portion of the kernel.

The flow of control begins at step 200 wherein each of the processors in the multiprocessor computer system is evaluated. Both the processor state and processor load are determined by examining the mpi block of each processor within the evaluation of step 200.

As described above, the processor may be in one of three states: source, sink, and neither. In step 200, an evaluation of the executing threads is performed to determine whether the processor is (a) a source, e.g., the processor is starving threads, (b) a sink, e.g., the processor is not starving threads and may accept additional threads for execution without causing the processor to starve threads, or (c) neither a source nor a sink, e.g., the processor is not currently starving threads but adding threads would cause the processor to begin starving threads.

The time since a TS thread has executed on the processor is compared against the preset starvation limit. In a current embodiment, the starvation limit is set to five seconds. The starvation limit is adjustable and different values may be appropriate for differing systems, e.g., different numbers of processors, types of processors, processor configurations, system configurations, and software. In addition, the time since the processor was idle, i.e., the time since the processor last executed any thread, is determined and compared against the preset starvation limit. If both the time since a TS thread has executed on the processor and the time since the processor was idle are greater than the preset starvation limit, then the processor is determined to be a source processor.

In addition to the processor state, the load on the processor is determined. The processor load is the number of threads ready to execute on the processor. The processor load does not provide information about which threads are executing on the processor.

After each processor is evaluated in step 200, the flow proceeds to step 202.

In step 202, the best and worst score processors identified as a result of step 200 are checked to determine if at least one processor is starving processes.

If no processors have been starving processes, then the flow proceeds to step 204 to balance the loads on the processors as in the prior art. Once the loads on each of the processors are balanced, the flow of execution returns to step 200 for processor evaluation.

If at least one of the processors is starving threads, i.e., at least one of the processors is in a source state, the flow proceeds to step 206.

If step 206 is reached, then at least one processor is starving threads and the threads should be moved to a processor which is not starving threads, i.e., a processor in a sink state. In step 206, the best and worst score processors identified as a result of step 200 are checked to determine if at least one processor is not starving processes and is able to receive an additional process without causing the processor to begin starving processes.

If there are no sink state processors, then there is no place for threads to be moved to and the load cannot be balanced among the processors, i.e., there is no place to transfer starving threads. In this case, the flow returns to step 200 for processor evaluation. In an alternate embodiment (dashed line of FIG. 2), if there are no sink state processors determined in step 206, the flow proceeds to step 204 and the load is balanced as described above (step 204).

If there is at least one sink state processor, then there is at least one processor which is able to receive an additional thread without causing the processor to begin starving threads. The flow of execution then proceeds to step 208 to balance the loads on the processor while avoiding starvation.

A computer system reaching step 208 has at least one processor in a source state and at least one processor in a sink state. In step 208, the kernel performs the load balancing.

Subsequent to identifying the best and worst score processors, the kernel selects a single TS thread from the highest ranking source processor, i.e., the worst score processor, and transfers it to the lowest ranking sink processor, i.e., the best score processor. The transferred TS thread is then ready to execute on the sink processor and the flow of control returns to step 200.

Although the transfer of a single thread is described, it is to be understood that more than one thread may be transferred at a time between processors. In order to avoid overcorrecting for the load balance, in a current embodiment only a single thread is transferred at a time between processors. If the load or starvation imbalance is very large, e.g., if the difference between loads on best and worst score processors is great, for example, greater than 100, the number of threads transferred could be increased. However, increasing the number of threads transferred increases the probability of overcorrecting for the load imbalance.

Another mechanism to accelerate the load balancing is to increase the frequency at which threads are transferred between processors. By decreasing the time between execution of the load balancing portion of the kernel, the load balancing is performed more frequently.

In order to further protect against constantly transferring threads between processors, each thread is transferred a single time before being transferred again. In other words, each thread to be transferred is moved once before any thread is moved a second time. In one current embodiment, a memory address of the thread structure is used to differentiate and identify threads for this purpose. According to the above embodiment, the thread with the least numerical distance above the previous thread moved is transferred. Because the thread will be transferred between processors, the identifier chosen needs to be globally unique across the computer system.

Example of Load Balancing With Starvation Avoidance

Figure 3:
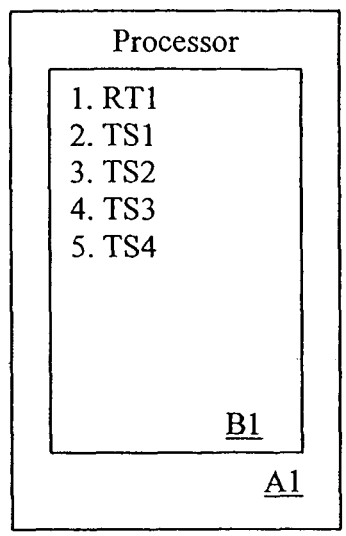
FIG. 3 is a high level block diagram of a system having multiple processors experiencing thread starvation.
Figure 3:
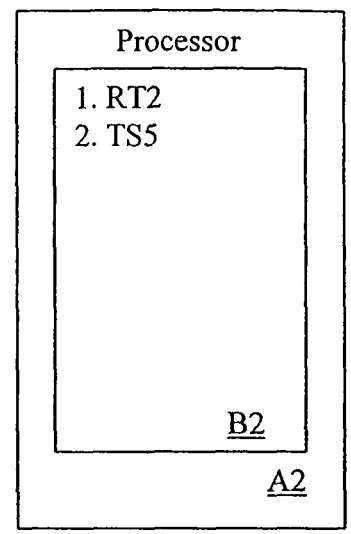
Figure 3:
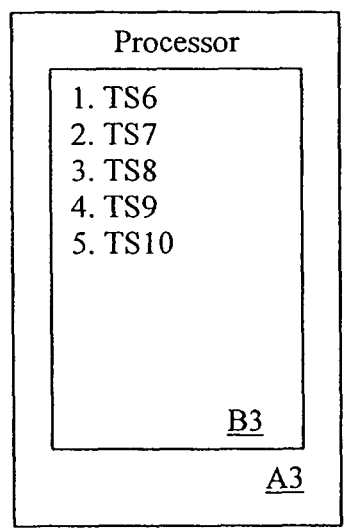
Figure 3:
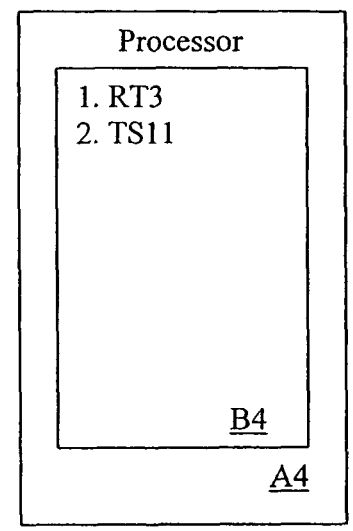
Figure 4:
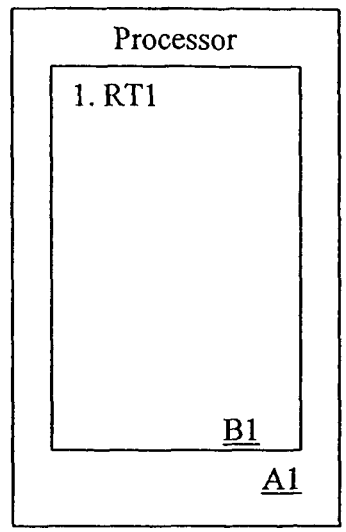
FIG. 4 is a high level block diagram of the system of FIG. 3 after load balancing with starvation avoidance; and, FIG. 5 is a high level block diagram of a computer system as used in the present invention.
Figure 4:
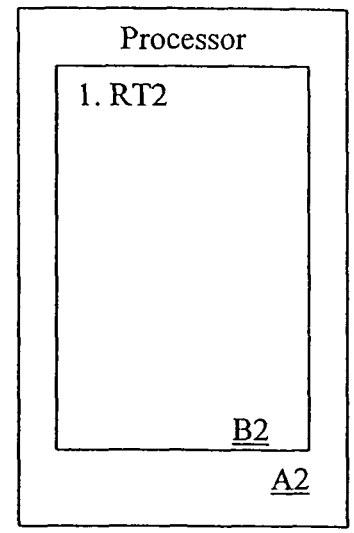
Figure 4:
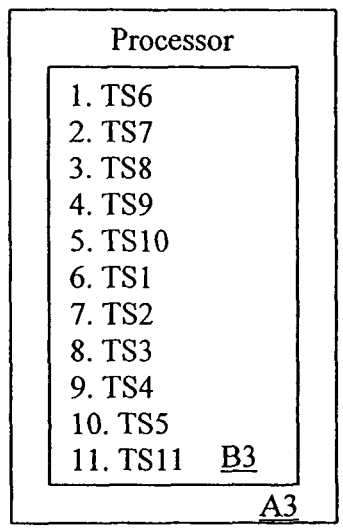
Figure 4:
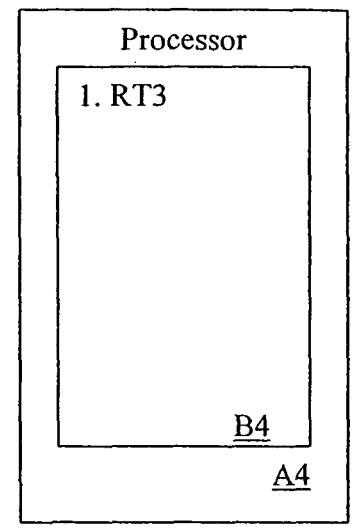

An example, with reference to FIGS. 3 and 4, is helpful to illustrate the operation of the present invention. Similarly to FIG. 1, FIG. 3 is a high level block diagram of four processors (A1-A4) of a multiprocessor computer system. Within each processor is shown a thread queue (B1-B4 of A1-A4, respectively) listing the currently executing thread (at position 1 of each thread queue) and any additional threads waiting to execute. For example, thread RT1 is the currently executing thread on processor A1 and threads TS1, TS2, TS3, and TS4 are waiting to execute on processor A1. Accordingly, threads RT2, TS6, and RT3 are executing on processors A2, A3, and A4, respectively. Thread TS5 is awaiting execution on processor A2, threads TS7, TS8, TS9, and TS10 are awaiting execution on processor A3, and thread TS11 is awaiting execution on processor A4.

Assuming all the RT threads (RT1-RT3) use all available processing time on their respective processors, three of the four processors, i.e., processors A1, A2, and A4, will be starving threads. Because the RT thread priorities do not degrade over time, as described above, there are no threads of sufficient priority to cause a processor to preempt the executing RT threads. Therefore, if the RT threads are using all available processor time, then the pending TS threads will not be able to execute. That is to say, threads TS1, TS2, TS3, and TS4 in thread queue B1 of processor A1 will not be able to execute while RT1 is executing, i.e., processor A1 is starving threads TS1, TS2, TS3, and TS4. Processor A2 is starving thread TS5 and processor A4 is starving thread TS11.

The present invention provides a mechanism to balance the loads on the processors to attempt to ensure that no thread starves, i.e., load balancing using starvation avoidance. The kernel evaluates each of the processors (step 200 of FIG. 2) to determine the processor state and load. Evaluating each of the processors in turn, the kernel determines that processor A1 is in a source state and has a load of 5, processor A2 is in a source state and has a load of 2, processor A3 is in a sink state and has a load of 5, and processor A4 is in a source state and has a load of 2. Thus, processor A3 is able to receive threads for execution.

Proceeding to step 202 of FIG. 2, the kernel checks to see if at least one processor is in a source state. In this particular example, processors A1, A2, and A4 are all in a source state so there is at least one processor with threads available to be transferred to another processor. Because there is at least one processor in a source state, the typical load balancing (step 204) is not performed.

The kernel next proceeds to check if any processors are in a sink state (step 206 of FIG. 2). Processor A3, as determined above (step 200 of FIG. 2), is in a sink state, i.e., able to receive threads from the other processors for execution. If there had been no processor available to receive threads, that is, in a sink state, the kernel would return to evaluating the processors. If no processor is able to receive threads, the kernel is unable to load balance the computer system because there is no processor to which to move threads. At this point, additional measures may need to be taken by either another portion of the kernel or a user.

Having determined that there is at least one source and at least one sink processor, the kernel proceeds to balance the load using starvation avoidance (step 208 of FIG. 2).

In order to balance the load on the processors A1-A4 and avoid starvation, the kernel transfers a single thread from the worst score processor, i.e., processor A1, to the best score processor, i.e., processor A3. The kernel selects one of the non-executing threads from the worst processor, i.e., the most heavily loaded, source state processor, and transfers the thread to the best processor, i.e., the least loaded, sink state processor. In the present example, one thread is transferred from processor A1 to processor A3. Upon transferring a single thread, the kernel then reevaluates the processors (step 200 of FIG. 2).

It is important to note that using the typical prior art load balancing mechanism, processors A1 and A3 would be equally scored based on having the same load value of 5. Using the prior art load balancing, the kernel would transfer threads from processors A1 and A3 to processors A2 and A4, even though the threads already present on processors A2 and A4 are starving and the newly transferred threads would immediately starve.

After several iterations using the load balancer of the present invention, the thread distribution among the processors A1-A4 would be as shown in FIG. 4. In FIG. 4, all of the TS threads have been transferred from processors having RT threads consuming all available processing resources, i.e., processors A1, A2, and A4, to a processor able to accept additional threads for processing without starving any threads, i.e., processor A3. The load among the processors A1-A4 has been balanced and starvation of threads has been avoided.

Further, because processor state is the primary key for the load balancer, the threads transferred to processor A3 will not be transferred to any of the other processors A1, A2, or A4 until the processors are in a sink state.

Hardware Overview

Figure 5:
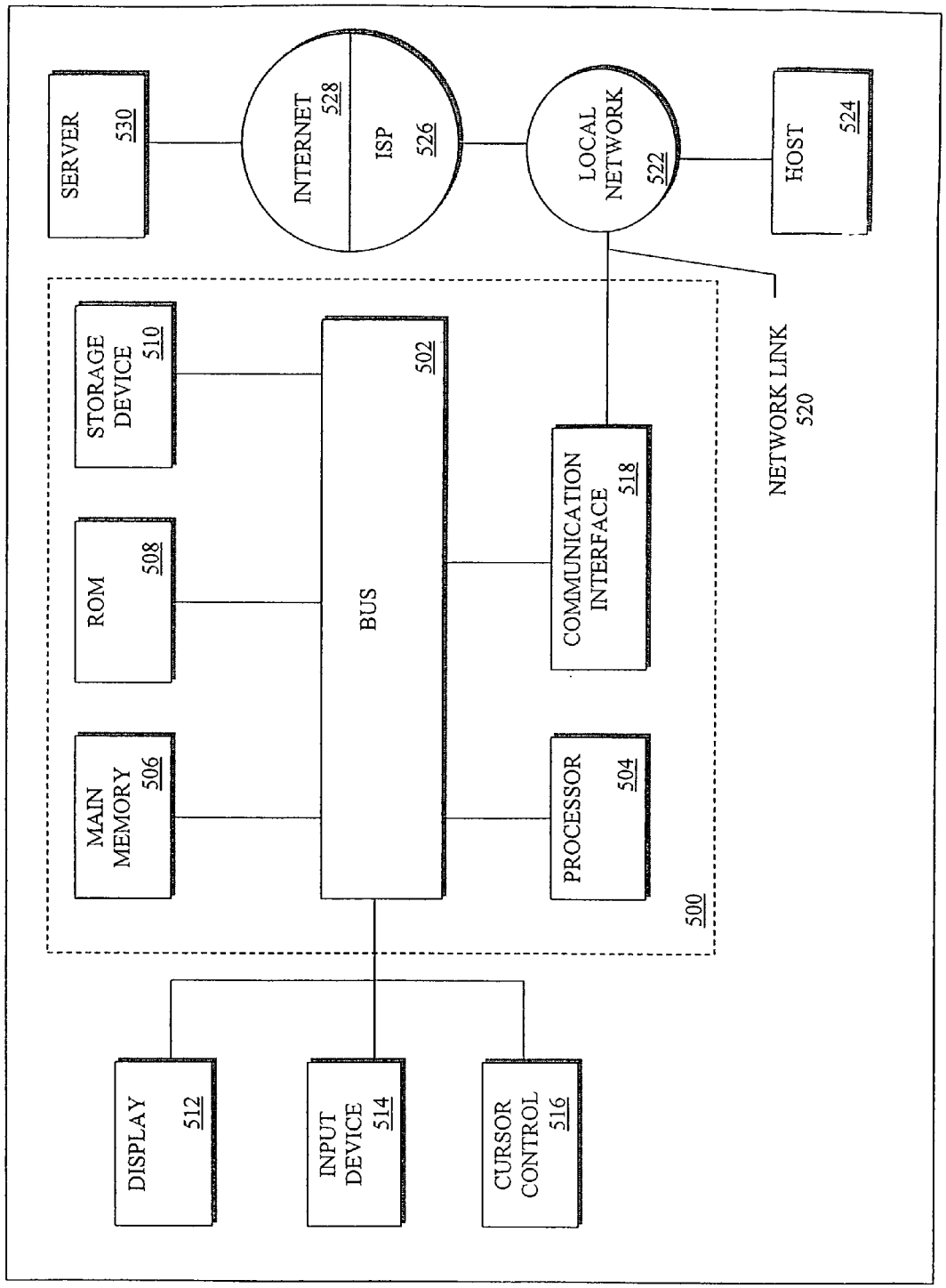

FIG. 5 is a block diagram illustrating an exemplary computer system 500 upon which an embodiment of the invention may be implemented. The present invention is usable with currently available personal computers, mini-mainframes, enterprise servers, multiprocessor computers and the like.

Computer system 500 includes a bus 502 or other communication mechanism for communicating information, and a processor 504 coupled with the bus 502 for processing information. Computer system 500 also includes a main memory 506, such as a random access memory (RAM) or other dynamic storage device, coupled to the bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions.

Computer system 500 may be coupled via the bus 502 to a display 512, such as a cathode ray tube (CRT) or a flat panel display, for displaying information to a computer user. An input device 514, including alphanumeric and other keys, is coupled to the bus 502 for communicating information and command selections to the processor 504. Another type of user input device is cursor control 516, such as a mouse, a trackball, or cursor direction keys for communicating direction information and command selections to processor 504 and for controlling cursor movement on the display 512. This input device typically has two degrees of freedom in two axes, a first axis (e.g., x) and a second axis (e.g., y) allowing the device to specify positions in a plane.

The invention is related to the use of a computer system 500, such as the illustrated system, to load balance threads to avoid starvation and use thereof. According to one embodiment of the invention, a load balancing mechanism is provided by computer system 500 in response to processor 504 executing sequences of instructions contained in main memory 506. Such instructions may be read into main memory 506 from another computer-readable medium, such as storage device 510. However, the computer-readable medium is not limited to devices such as storage device 510.

For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 506 causes the processor 504 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 500 also includes a communication interface 518 coupled to the bus 502. Communication interface 518 provides a two-way data communication as is known. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information. Of particular note, the communications through interface 518 may permit transmission or receipt of the operating software program scheduling information. For example, two or more computer systems 500 may be networked together in a conventional manner with each using the communication interface 518.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for an expression-based mechanism for triggering and testing exceptional conditions in software and use thereof, as described herein.

The received code may be executed by processor 504 as it is received, and/or stored in storage device 510, or other non-volatile storage for later execution. In this manner, computer system 500 may obtain application code in the form of a carrier wave.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

For example, although a single computer system having multiple processors has been described above, the invention may also be practiced using multiple, networked, single processor computer systems. Further, additional processor states may be used beyond the sink, source, and neither states described. The processor state must be the primary key for the load balancing to avoid starvation.

What is claimed is:

1. A computer implemented method of load balancing a multiprocessor computer system, comprising:
   determining a state of each of two or more processors, wherein the state includes at least one of a source state and a sink state;
   if at least one of the two or more processors is in the source state and at least one of the two or more processors is in the sink state, transferring at least one thread from a queue of a source state processor to a queue of a sink state processor, wherein the source state processor has at least one starving thread, and the sink state processor has no starving thread; and
   identifying a given one of the two or more processors as being in the source state in response to determining that a thread associated with the given processor has not executed on the given processor for greater than a preset starvation time limit, and that a time since the given processor was idle is greater than the preset starvation time limit.

2. The method as claimed in claim 1, wherein the determined state further includes a neither state.

3. The method as claimed in claim 1, further comprising repeating the determining and transferring.

4. The method as claimed in claim 1, wherein the method further comprises:
   determining a load of each of the two or more processors.

5. The method as claimed in claim 4, wherein the transferring includes:
   transferring at least one thread from a highest loaded, source state processor to a lowest loaded, sink state processor.

6. A computer implemented method of load balancing a multiprocessor computer system, comprising:
   determining a score of each of two or more processors, wherein the score is a function of at least a processor state, the processor state being a state of a corresponding one of the two or more processors, and the processor state selected from among at least a source state and a sink state, the source state indicating that at least one thread on the corresponding processor is starving and a time since the corresponding processor was idle is greater than a preset time limit, wherein the at least one thread is starving if the at least one thread has not executed on the corresponding processor for greater than the preset time limit, and the sink state indicating that no thread on the corresponding processor is starving;
   determining a best score processor and a worst score processor based on the determined scores of the two or more processors; and
   transferring at least one thread from a queue of the worst score processor in a source state to a queue of the best score processor in a sink state.

7. The method as claimed in claim 6, wherein the score is also a function of a processor load of a corresponding one of the two or more processors.

8. The method as claimed in claim 7, wherein the processor state is weighted more heavily than the processor load in determining the score.

9. A computer implemented method of load balancing a plurality of computer systems, comprising:
   determining a state of each of the plurality of computer systems, wherein the state includes at least one of a source state and a sink state;
   if at least one of the plurality of computer systems is in the source state and at least one of the plurality of computer systems is in the sink state, transferring at least one thread from a source state computer system to a sink state computer system, wherein the source state computer system has at least one starving thread, and the sink state computer system has no starving thread; and
   identifying a given one of the plurality of computer systems as being in the source state in response to determining that a thread associated with the given computer system has not executed on the given computer system for greater than a preset starvation time limit, and that a time since the given computer system was idle is greater than the preset starvation time limit.

10. A computer system for balancing load using starvation avoidance comprising:
    processors for receiving and transmitting data; and
    a memory coupled to said processors, said memory having stored therein sequences of instructions which, when executed by one of said processors, cause the one of said processors to:
       determine a state of each of said processors, wherein the state includes at least one of a source state and a sink state;
       if at least one of the processors is in the source state and at least one of the processors is in the sink state, transfer at least one thread from a source state processor to a sink state processor, wherein the source state processor has at least one starving thread, and the sink state processor has no starving thread; and
       identify a given one of the processors as being in the source state in response to determining that a thread associated with the given processor has not executed on the given processor for greater than a preset starvation time limit, and that a time since the given processor was idle is greater than the preset starvation time limit.

11. A method of load balancing in a multiprocessor computer system, comprising:
    identifying, by a load balancer executed in the multiprocessor computer system, states of corresponding processors in the multiprocessor system, wherein the states are selected from among at least a source state and a sink state, the source state indicating that the corresponding processor has at least one starving thread, and the sink state indicating that the corresponding processor does not have a starving thread;
    running at least one real-time thread and at least one time share thread on at least one of the processors;
    determining whether any of the processors is in the source state;
    determining whether one of the processors is in the sink state;
    computing scores for corresponding ones of the processors, wherein each of the scores is based on the state of the corresponding processor and a load of the corresponding processor;
    in response to determining multiple processors of the corresponding processors being in the source state, selecting one of the multiple processors from which a starving time share thread is transferred based on the scores of the respective multiple processors; and transferring the starving time share thread from a queue of the selected processor to a queue uniquely associated with the processor in the sink state.

12. The method of claim 11, wherein the queue of the selected processor is within the selected processor, and the queue uniquely associated with the processor in the sink state is within the processor in the sink state.

13. The method of claim 11, further comprising:

in response to determining that no processor is in the sink state after determining that the multiple processors are in the source state, keeping the starving time share thread in the queue of the selected processor.

14. A multiprocessor computer system, comprising:

a plurality of processors;

queues within the corresponding processors, wherein each of the queues is to store one or more threads for execution on the corresponding processor;

a time share thread and a real-time thread executable on at least one of the processors; and a load balancer configured to:

determine whether any of the processors is in a first state that indicates that at least one thread in the queue in the corresponding processor is starving;

determine whether any other one of the processors is in a second state that indicates that the corresponding processor has no starving thread;

compute scores for corresponding ones of the processors, wherein each of the scores is based on the state of the corresponding processor and a load of the corresponding processor;

in response to determining multiple processors of the corresponding processors being in the first state, select one of the multiple processors from which a starving time share thread is transferred based on the scores of the respective multiple processors; and transfer the starving time share thread from the queue in the selected processor to a queue in a processor in the second state.

15. The multiprocessor computer system of claim 14, wherein the load balancer is configured to further:

in response to determining that no other processor is in the second state, keep the starving thread in the queue in the selected processor.

* * * * *